(12) United States Patent  (10) Patent No.: US 7,147,380 B2
Bianco  (45) Date of Patent: Dec. 12, 2006

(54) PRESSURE SCREW ASSEMBLY PRIMARILY USED WITH AN AXIALLY GUIDED LOCKING RING TO PERMIT CONTROLLED AXIAL CLEARANCE MOVEMENT OF THE CHOCK BEARING

(75) Inventor: Edward P. Bianco, New Boston, MI (US)

(73) Assignee: The Timken Company, Canton, OH (US)

( * ) Notice: Subject to any disclaimer, the term of this patent is extended or adjusted under 35 U.S.C. 154(b) by 609 days.

(21) Appl. No.: 10/682,629

(22) Filed: Oct. 9, 2003

(65) Prior Publication Data

US 2005/0078900 A1 Apr. 14, 2005

(51) Int. Cl.
*F16C 35/06* (2006.01)
*F16C 27/00* (2006.01)

(52) U.S. Cl. .................... 384/518; 384/519; 384/537; 384/542; 384/420; 267/177

(58) Field of Classification Search .............. 384/518, 384/519, 537, 540, 542, 420, 303, 308, 312; 267/177–179; 403/166; 74/473.28; 411/347
See application file for complete search history.

(56) References Cited

U.S. PATENT DOCUMENTS

| | | | |
|---|---|---|---|
| 1,393,610 A | 10/1921 | Candee | |
| 1,938,402 A | 12/1933 | Renner et al. | |
| 2,182,596 A | * 12/1939 | Andersen | 74/495 |
| 2,348,292 A | * 5/1944 | Gross | 188/68 |
| 2,584,740 A | 2/1952 | Reynolds | |
| 2,678,856 A | 5/1954 | Chievitz | |
| 2,850,274 A | * 9/1958 | Villar | 267/178 |
| 3,033,597 A | 5/1962 | Miller | |
| 3,054,302 A | * 9/1962 | Cone | 74/473.28 |
| 3,063,743 A | 11/1962 | Kylen | |
| 3,304,139 A | 2/1967 | Toth et al. | |
| 3,462,180 A | 8/1969 | Bunyan | |
| 3,619,994 A | 11/1971 | Gepfert et al. | |
| 3,624,880 A | 12/1971 | Justus et al. | |
| 3,945,234 A | 3/1976 | Steinbock | |
| 4,012,154 A | 3/1977 | Durwin et al. | |
| 4,104,995 A | 8/1978 | Steinbock | |
| 4,136,989 A | 1/1979 | Bianco | |
| 4,189,251 A | 2/1980 | Bianco | |
| 4,200,407 A | 4/1980 | Bianco | |
| 4,307,594 A | 12/1981 | Steinbock | |
| 4,338,037 A | 7/1982 | Deminski | |
| 4,622,730 A | 11/1986 | Steinbock | |
| 4,846,614 A | 7/1989 | Steinbock | |

(Continued)

*Primary Examiner*—William C. Joyce
(74) *Attorney, Agent, or Firm*—Dykema Gossett PLLC

(57) ABSTRACT

A locking ring assembly retains a bearing to a shaft rotatably supported on a first axis of rotation. Guide pins or rods extend axially from an annularly shaped bearing retainer slideably disposed on the shaft towards the pressure ring, also slideably disposed on the shaft. The heads of the guide pins are slideably disposed and captured in adjusting apertures of the pressure ring. A multi part pressure screw assembly are provided in the adjusting apertures of the pressure ring. Such pressure screws translate axially in the apertures of the pressure ring when rotated, with the thrust pads engaging the heads of the guide pins to displace the pressure ring from the bearing retainer. The pressure ring reacts against a reactive element or ring disposed on the shaft opposite the bearing retainer to develop an axial pressure load against the bearing.

19 Claims, 4 Drawing Sheets

U.S. PATENT DOCUMENTS

| | | |
|---|---|---|
| 4,923,323 A | 5/1990 | Steinbock |
| 4,934,081 A * | 6/1990 | Mooney ........................ 42/62 |
| RE33,490 E | 12/1990 | Steinbock |
| 5,075,950 A | 12/1991 | Steinbock |
| 5,083,889 A | 1/1992 | Steinbock |
| 5,411,337 A | 5/1995 | Bianco et al. |

* cited by examiner

PRESSURE SCREW ASSEMBLY PRIMARILY USED WITH AN AXIALLY GUIDED LOCKING RING TO PERMIT CONTROLLED AXIAL CLEARANCE MOVEMENT OF THE CHOCK BEARING

BACKGROUND OF THE INVENTION

1. Field of the Invention

The present invention relates generally to the bearing retainer art and more particularly to an expandable bearing retainer or locking device construction which is particularly applicable for use on mill roll necks, shafts and the like.

2. Description of the Prior Art

Locking ring assemblies particularly applicable for use on mill roll necks, shafts and the like are available in a wide variety of configurations. These devices are disclosed and claimed in patents which issued to Romolo B. Bianco including U.S. Pat. No. 4,136,989 issued Jan. 30, 1979 entitled "Expandable Annular Cam-Type Locking Device For a Shaft"; U.S. Pat. No. 4,189,251 issued Feb. 19, 1990 entitled "Expandable Annular Locking Device For a Shaft"; and U.S. Pat. No. 4,200,407 issued Apr. 29, 1980 entitled "Bolted Annular Locking Collar For a Shaft". In addition, the Edward P. Bianco, et al U.S. Pat. No. 5,411,337, issued May 2, 1995 entitled "Axially Guided Locking Ring Assembly" is also directed to a locking device which retains a bearing on a mill roll shaft.

Structures typical of the prior art have a portion or an element disposed in an annular groove of the shaft with an adjusting mechanism disposed between the groove and a bearing to be retained on the shaft. The bearing is typically pressed by the adjusting mechanism against a shoulder of the shaft such as is shown in U.S. Pat. No. 5,411,337.

Mill roll shafts and retainer bearings mounted thereon are complicated by the large size of the associated components and the resultant high axial thrust loads required to maintain the bearings in their desired positions. The construction of the locking ring assemblies for mill roll shafts is further complicated by the dirty, harsh operating environment in which the locking ring assemblies are employed. The intrusion of dirt and contaminants into undesired locations within a locking ring assembly can potentially affect its ability to maintain the required thrust load against the bearing.

There is also a need in the bearing retainer art to maintain pressure on the bearing and to allow for axial movement of the bearing, which is necessary for the bearing to seat properly on the shaft. It is also necessary to have space for thermal expansion of the bearing. Normal requirements of the bearing manufacturers for this bearing movement to occur ranges from 0.010 inch to 0.050 inch, more or less. The prior art devices including U.S. Pat. No. 5,411,337 do not compensate sufficiently for thermal expansion and thus does not provide for axial movement of the chock bearing. Thus, there is a need to provide an axially guided locking ring assembly containing a plurality of adjustable pressure screw assemblies allowing for controlled axial clearance or end play movement of the chock bearing due to thermal expansion.

SUMMARY OF THE INVENTION

In one aspect of the invention, a locking ring for retaining a chock bearing to a shaft which is rotatably supported on a first axis of rotation is disclosed comprising the retaining ring or reaction means, a pressure ring, a bearing retainer and a plurality of guide pins. The retaining ring engages a circumferential slot in the shaft. The pressure ring is slideably located on the shaft between the retaining ring and the bearing. The pressure ring has a plurality of apertures parallel to the first axis of rotation. Each aperture has a threaded portion and a non-threaded guide portion, with the guide portion disposed towards the bearing. The bearing retainer is disposed between the pressure ring and the chock bearing and has a loading face on a first side of the bearing retainer for contacting the bearing. The guide pins are fixed to the second side of the bearing retainer and are arranged parallel to the first axis of rotation. The first end of the guide pins has a head slidably disposed and captured in the guide portion of the aperture of the pressure ring. A novel multi part pressure screw assembly is threaded into the threaded portion of each pressure ring aperture and engages the guide pin.

In another aspect of the present invention, each pressure screw assembly comprises a general cylindrical body having a pair of end faces and a longitudinally extending axis extending through the cylindrical body and the end faces. The body has first, second and third concentric interconnected cylindrical bores between the end faces. The first bore adjacent one of the end faces is larger in diameter than the other bores. The second bore adjacent to the other of the end faces is larger in diameter than the third bore and is internally threaded. The third bore connects the first and second bores. The cylindrical body has external threads throughout the major portion of its length and includes a leading thread and a trailing thread. The remaining portion of the length of the cylindrical body is provided with an external polygonal shaped head between the other end face and the trailing thread. A floating annular thrust pad is received in the first bore and has a centrally located threaded bore extending partway therethrough. Each pressure screw assembly has a bolt having threads on one end and a head on the other end, with the threaded end and the head end of the bolt being separated by a cylindrical portion. The bolt is located in the three concentric bores of the pressure screw body with the head in the second bore, the cylindrical portion in the third bore and the threaded end threaded into the threaded bore of the thrust pad. A biasing means is received in the second bore and abuts the head of the bolt. An adjustable externally threaded adjusting screw is threaded into the second bore of each pressure screw assembly and engages the biasing means for varying the bias thereof.

In still another aspect of the present invention is that the prior art one-piece solid pressure screw is now made in multiple pieces or parts thus allowing for controlled axial clearance or end play movement of the chock bearing. With such a construction, a multiple piece pressure screw assembly will maintain pressure on the chock bearing and will allow for axial movement of the chock bearing, which is necessary for the bearing to seat properly and to have space for thermal expansion.

Yet another aspect of the present invention is that the multiple piece pressure screw assembly contains five components including a main pressure screw cylindrical body, a floating thrust pad, a thrust pad bolt, a thrust pad pressure spring and a thrust pad pressure spring adjusting screw.

When the present invention is used, the pressure spring adjusting screw is tightened to allow for no movement of the floating thrust pad. As a result, the main pressure screw assembly components are tightened to provide a solid locking of the pressure ring, retaining ring and the bearing retainer to the chock bearing, thereby locking the chock, bearing and roll into one assembly. The procedure used with the present invention further provides for backing off of the adjusting screw a predetermined number of turns, normally two turns. This backing off of the adjusting screw will relax the spring tension and will provide for axial movement of the chock bearing while still maintaining some tension. This permits the bearing to float and provides for axial clearance. Dimensional changes to the components of the pressure screw assembly will allow for a wide range of axial clearance.

Another aspect of the present invention is that the size of the pressure screw and components will be determined by the size of the pressure ring. In use, there will be a minimum of four pressure screw assemblies per pressure ring up to ten or twelve, again depending on the size of the pressure or locking ring. The larger the bearing locking ring housing, the larger the pressure or locking ring and the larger the pressure screw assembly. Thus, the provided clearance and tension will be determined by the bearing design and size and by the requirements of the bearing manufacturer.

Finally, a further feature of the present invention is to provide a novel pressure screw assembly primarily for use in an axially guided locking or pressure ring which permits control axial clearance movement of the chock bearing of a mill.

DETAILED DESCRIPTION OF THE PREFERRED EMBODIMENT

Figure 1:
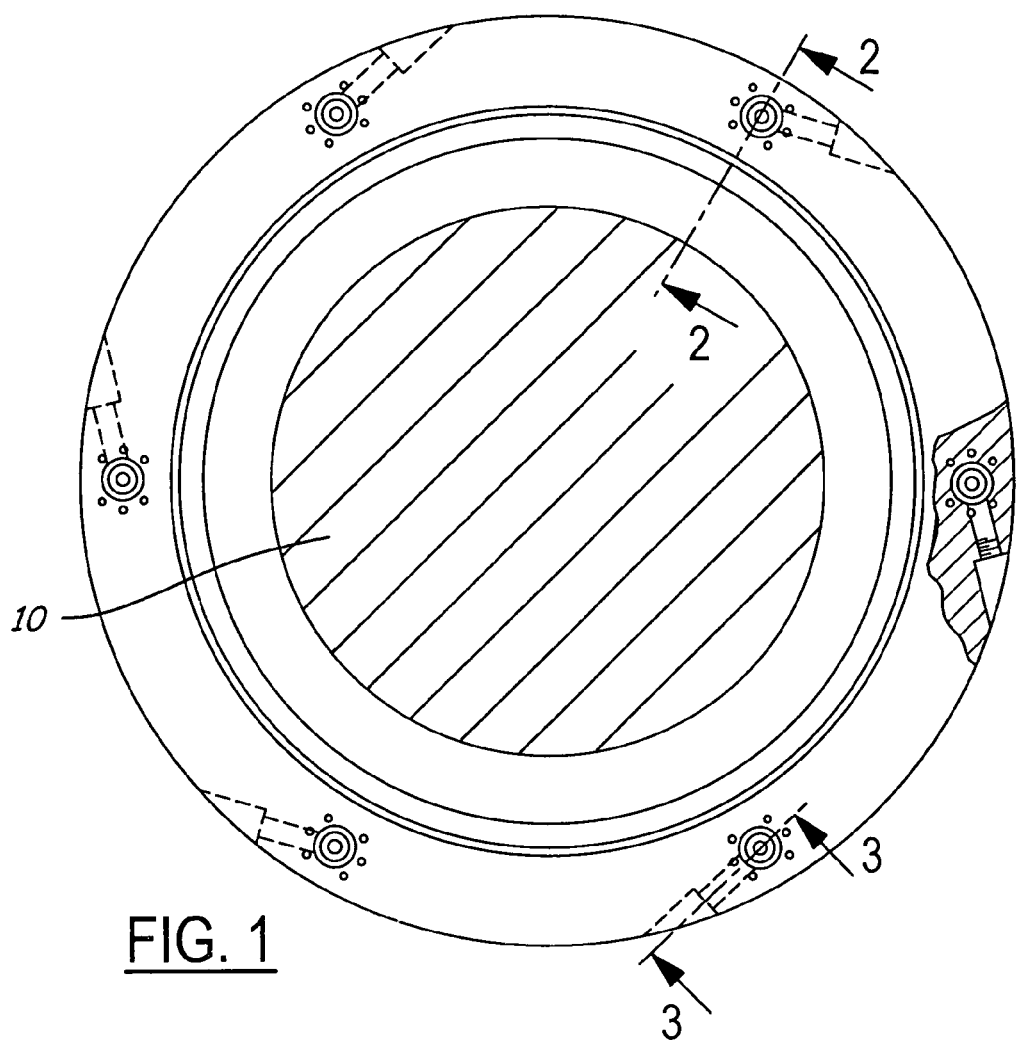
FIG. 1 is a sectional axial end view of a mill roll shaft with a locking or pressure ring assembly mounted thereon.
Figure 2:
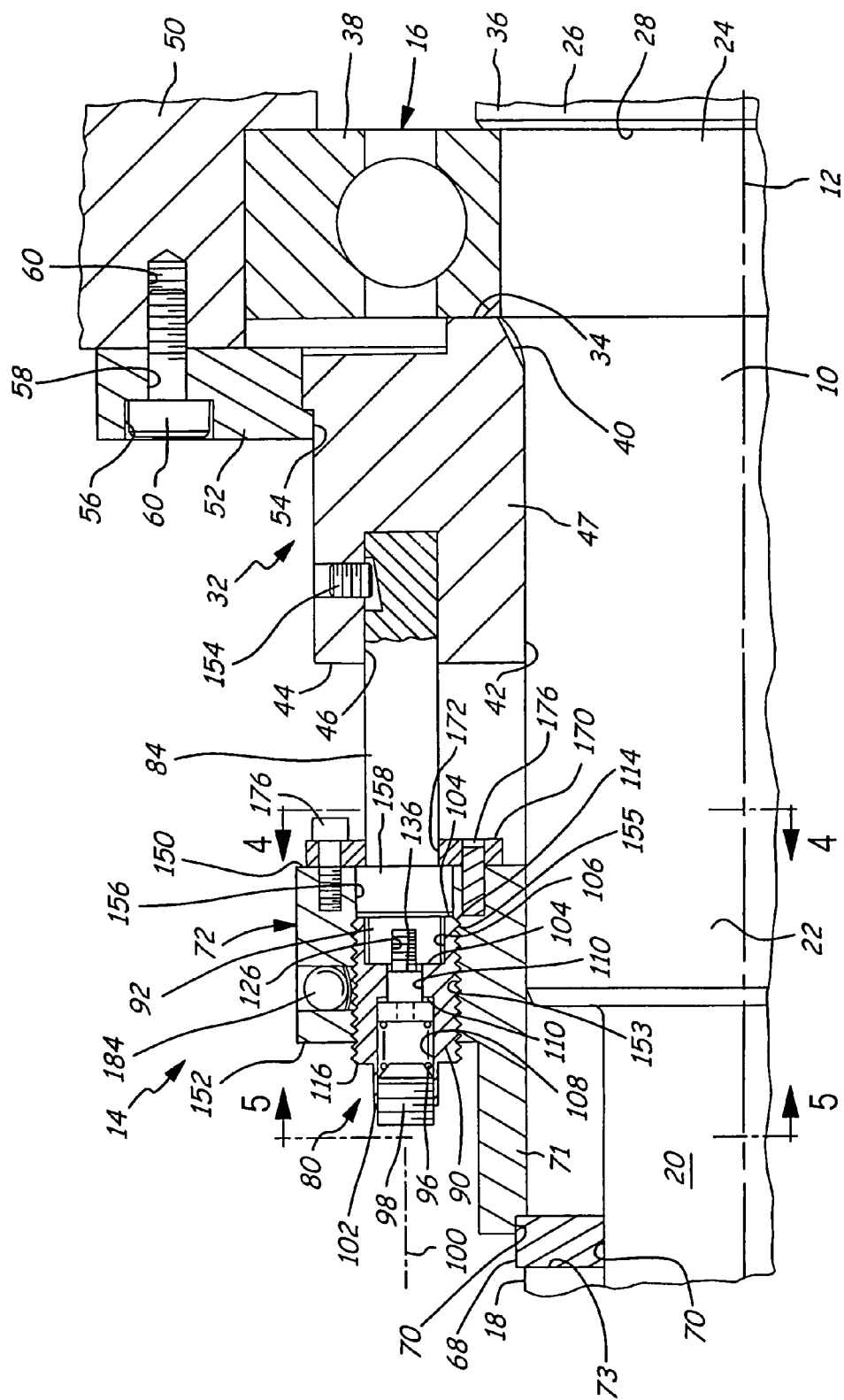
FIG. 2 is a diagrammatic sectional view of the locking or pressure ring assembly looking in the direction of arrows 2—2 of FIG. 1.
Figure 4:
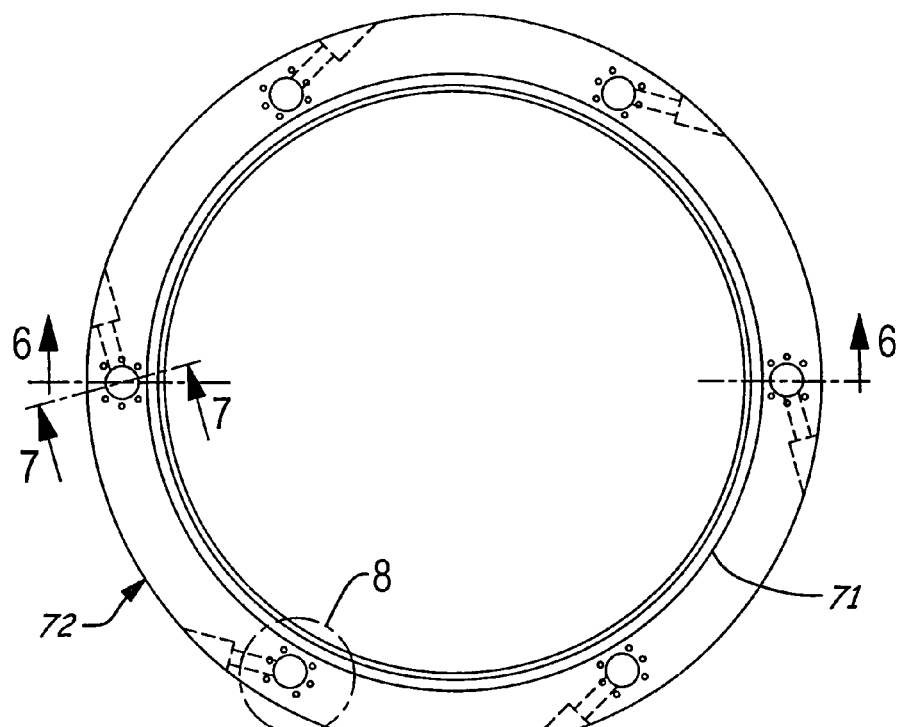
FIG. 4 is a sectional view taken on the line 4—4 of FIG. 2.
Figure 5:
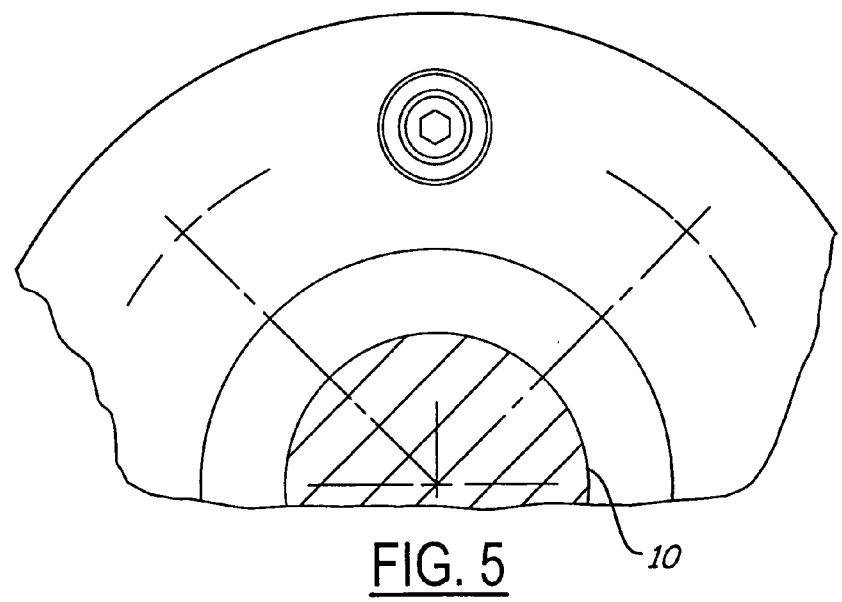
FIG. 5 is a fragmentary sectional view taken on the line 5—5 of FIG. 2.
Figure 6:
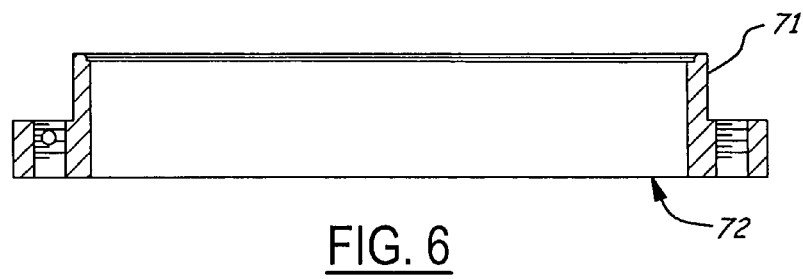
FIG. 6 is a sectional view through the locking or pressure ring looking in the direction of arrows 6—6 of FIG. 4.
Figure 7:
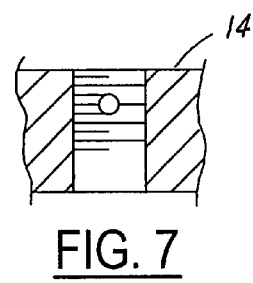
FIG. 7 is a sectional view through the locking ring looking in the direction of arrow 7—7 of FIG. 4.
Figure 8:
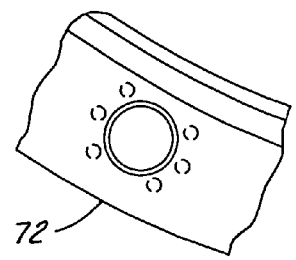
FIG. 8 is a fragmentary view of a part of the locking or pressure ring of FIG. 4 within the circle numbered 8.

Referring now to the drawings and in particular FIGS. 1 and 2, a conventional mill roll shaft is designated by the numeral 10. The shaft 10 has a longitudinally extending axis referred to herein as the first axis of rotation 12. The shaft 10 has a plurality of cylindrical portions on which are disposed the pressure or locking ring assembly 14 and the chock bearing 16. The pressure or locking ring assembly 14 and bearing 16 are mounted on opposite portions of the shaft as best shown in FIG. 2. Shaft 10 has a first cylindrical portion 18, followed by a second cylindrical portion 20 which is smaller in diameter than the first cylindrical portion 18. A third cylindrical portion 22 is located to the immediate right of the second cylindrical portion 20 and has a diameter at least as large as the first cylindrical portion 18. The shaft 10 further includes a fourth cylindrical portion 24 located to the immediate right of the third cylindrical portion 22. The fourth cylindrical portion has a diameter larger than the third cylindrical portion 22. The shaft 10 further includes a fifth and final cylindrical portion 26 located to the immediate right of the fourth cylindrical portion 24. The fifth cylindrical portion 26 is larger in diameter than the adjacent cylindrical portion 24 as illustrated in FIG. 2.

The chock bearing 16 is disposed on the fourth cylindrical portion 24 and abuts a shoulder 28 of the fifth cylindrical portion 26. An annular bearing retainer 32 is disposed on the third cylindrical portion 22 of the shaft 10. Bearing retainer 32 has a loading face 34 on a first side disposed against the adjacent face or side of the chock bearing 16. The loading face 34 is configured so as to contact only the annular inner race 36 of the bearing 16 and to avoid contact with the outer race 38. The bearing retainer 32 has a beveled or inclined surface 40 adjacent the loading face 34. With such a construction, the loading face 34 avoids contact with the fifth cylindrical portion 28 of the mill roll shaft 10.

The inner race 36 of the chock bearing 16 is press fit over the fourth cylindrical portion 24. The bearing retainer 32 has an annular opening 42 sized to provide a clearance fit over the third cylindrical portion 22 of the mill roll shaft 10. The bearing retainer 32 has a front or first side 44 in which is provided a plurality of non-threaded apertures or cavities 46 which extend from the first face 44 a predetermined depth into the solid body 47. The cavities 46 are circumferentially spaced apart with respect to the first axis of rotation 12.

The bearing chock or housing 50 of the mill is disposed over the outer race 38 of the bearing 16. An annular seal plate 52 is fixed to the bearing chock 50 and together with the bearing retainer 32 forms an annular labyrinth seal 54. The annular seal plate 52 is provided with a plurality of cavities 56 concentrically aligned with openings 58 for receiving threaded fasteners 60 which extend through the seal plate 52 into threaded engagement with the aligned threaded cavities 60 provided in the chock housing 50.

The mill roll shaft 10, when worn out, can be removed from the entire mill assembly and replaced with a new shaft 10 without removing the bearing 16, chock block or housing 50, bearing retainer 32 and the pressure or locking ring assembly 14. The bearing 16 and the bearing retainer 32 are retained by the bearing chock 50 and the seal plate 52. It is only necessary to remove the reaction means or retaining ring 68 which is disposed on the second cylindrical portion 20 of shaft 10 between the circumferential notch or undercut 70 in the flange 71 of the pressure ring 72 and a shoulder 73 of the first cylindrical portion 18 of the shaft 10. Thus, only the retaining ring or reaction member 68 needs to be removed to allow the shaft 10 to be pulled from the mill for repair, reconstruction or replacement. The retaining ring 68 is manufactured in multiple parts to facilitate installation and removal from shaft 10 as is known in the art.

The chock housing 50, seal plate 52 and bearing retainer 32 may expand to the left when viewed in FIG. 2 upon thermal expansion of the chock bearing 16. The amount of thermal expansion or movement permitted is determined by the setting or strength of the pressure screw assemblies 80 carried by the annular pressure ring 72. Each pressure screw assembly 80 consists of five component parts which will hereinafter be identified. The pressure screw assemblies 80 are effective in conjunction with the axially extending guide pins or rods 84 which are anchored in the cavities 46 of the bearing retainer 32 for allowing for controlled-axial clearance or end play movement of the chock bearing 16. The adjusting pressure screw assemblies 80 will maintain pressure on the chock bearing 16 while still permitting axial movement of the chock bearing 16 which is required for the chock bearing 16 to seat properly on the shaft 10 and also to provide space for thermal expansion of the chock bearing 16. The chock bearing manufacturers recommend a range of movement for the chock bearing of 0.010 inch to 0.050 inch, more or less.

The pressure ring 72 may have any number of pressure screw assemblies 80, as an example, four pressure screw assemblies 80 per ring up to ten or twelve pressure screw assemblies per pressure ring, depending on the size of the chock bearing. The larger the bearing chock housing, the larger the pressure or locking ring and therefore the larger the pressure screw assemblies.

Figure 9:
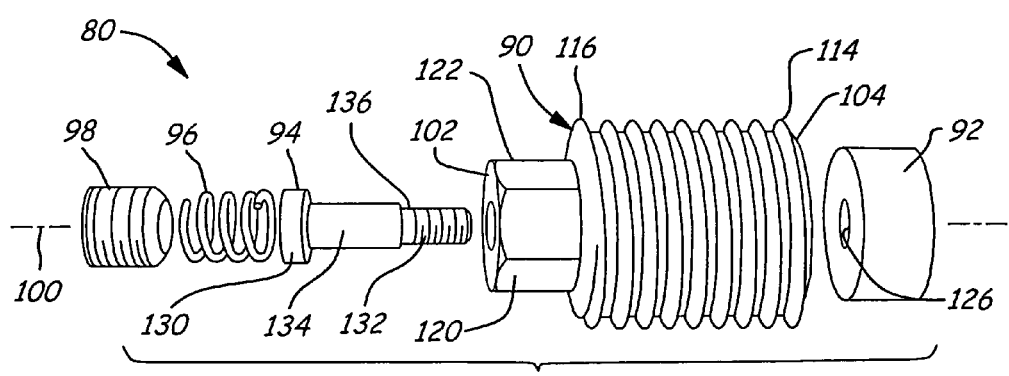
FIG. 9 is an exploded isometric view of the five component parts of the pressure screw assembly.

Referring now to FIGS. 2 and 9, each pressure screw assembly 80 consists of five components namely the pressure screw cylindrical body 90, a floating thrust pad 92, a thrust pad bolt 94, biasing means, as an example, in the form of a coil spring 96 and a spring adjusting screw 98.

The pressure screw assembly 80 and the cylindrical pressure screw body 90 has a longitudinally extending axis 100 parallel to and spaced from the shaft axis or first axis of rotation 12 of the mill shaft 10. The cylindrical body 90 has a pair of end faces 102 and 104. The longitudinally extending axis 100 extends through the body 90 and the end faces 102 and 104. The cylindrical body 90 further includes three concentric interconnected cylindrical bores located between the end faces 102 and 104. The first bore 106 is located adjacent the end face 104. The second bore 108 is elongated and is located adjacent the other end face 102. The second bore 108 has an internal first annular abutment surface 110 which is parallel to the end face 102. Located between the first annular bore 106 and the second annular bore 108 is a third annular bore 110. The bores 106, 108 and 110 are interconnected as illustrated in FIG. 2, with the first annular bore 106 being larger in diameter than the other bores 108 and 110. The second bore 108 is larger is diameter than the third bore 110 which is smaller in diameter than both of the bores 106 and 108. The second bore 108 is internally threaded so as to receive the threaded adjusting screw 98. The outer end of the adjusting screw 98 is provided with a hex socket, not shown, to receive or to accommodate a hex-shaped drive tool for rotating the adjusting screw 98. The cylindrical body 90 has a leading thread 114 and a trailing thread 116. The threads on the cylindrical body 90 extend throughout the major portion of its length. The remaining portion of the length of the cylindrical body 90 is provided with an external polygonal shaped head 120 between the end face 102 and the trailing thread 116.

The floating annular thrust pad 92 has a centrally located threaded bore 126 extending part of the way therethrough as best shown in FIG. 2. The floating annular thrust pad 92 is received in the first bore 106 with clearance therebetween and is engageable with the first abutment surface 104. The bolt 94 has a head 130 at one end and a threaded stem 132 on the other end. The 94 bolt further includes cylindrical portion 134 which separates the head 130 from the threaded end or stem 132. The cylindrical portion 134 of the bolt 94 provides an annular third abutment surface 136. The bolt 94 enters the annular cylindrical body 90 through the front face 102 and the second bore 108 where the head 130 is contained in the second bore 108, the cylindrical bolt portion 134 is retained in the third bore 110 and the threaded stem 132 is threaded into the threaded cavity 126 of the thrust pad 92 which is located in the first bore 106 of the adjusting screw body 90.

Biasing means in the form of a coil spring 96 is inserted into the second bore 108 and has one end abutting the head 130 of the bolt 94. The adjustable externally threaded adjusting screw 98 is threaded into the second bore and has a leading end thereof engaging the other end of the coil spring 96 and urging the spring 96 against the head 130 of the bolt 94.

The pressure ring 72 and its annular flange 71 are also slidably disposed over the shaft 10. The ring 72 has a first side 150 disposed towards the bearing retainer 32 and an oppositely facing second side 152 in which is located a plurality of adjusting apertures 153 extending parallel to the first axis of rotation 12. Each of the adjusting apertures 153 has a threaded portion 155 between the second side 152 and a point between the first side 150 and second side 152. Another portion of the apertures 153 defines or provides a substantially smooth guide portion 156 between the threaded portion 155 and the first side 150 of the pressure ring 72.

As mentioned previously, the second side of the bearing retainer 32 is provided with a plurality of circumferentially extending cavities 46 which are opposite and spaced from the adjusting apertures 153 in the pressure ring 72. Each of the cavities 46 of the bearing retainer 32 is provided with an elongated guide pin or rod 84 mounted on one end in the cavity and retained therein by an adjusting screw 154. The other end of the guide pin 84 is provided with a generally cylindrical head 158 which is received in the opposing smooth guide portion 156 provided in the first side 150 of the pressure ring 72. It should be noted there is a slight space between the opposing head 158 of the guide pin 84 and the floating pad 92 as best illustrated in FIG. 2. This space is eliminated upon the tightening of the adjusting screw 98 and the moving of the bolt 94 and pad 92 to the right as viewed in FIG. 2.

In operation, each of the adjustable externally threaded adjusting screws 98 are tightened to urge the pad 92 against the head 158 of the corresponding guide pin 84 which will prevent any further movement of the thrust pad 92. Each pressure screw assembly 80 is tightened to provide a solid locking pressure ring 14, retaining ring 68 and the bearing retainer 32 with the chock bearing 16 thereby locking the chock bearing 16 and shaft 10 into one assembly. Once all of the pressure screw assemblies 80 have been tightened so as to connect all of the component parts mounted on the shaft 10 into one assembly, it is then necessary to provide for thermal expansion of the bearing 16 by backing off each of the adjusting screws 98 a predetermined number of turns, as an example, two turns. This will relax the tension in the coil spring 96 and will thereafter provide for axial movement of the chock bearing 16 while still maintaining some tension on the coil spring 96 providing for some axial clearance which will permit the bearing 16 to float. With this novel construction, the new pressure screw assemblies 80 provide axial clearance for the bearing 16 and bearing housing 50. Each pressure pad 92 after adjustment is under some constant spring tension. If there is any thrust movement or thermal expansion of the chock bearing 16, then the bearing 16 will apply some force through the bearing retainer 32 and the guide pins or rods 84 against the floating pressure pads 92 allowing for some clearance or movement of bearing 16.

The size of the pressure screw and components will be determined by the size of the pressure or locking ring. The larger the chock housing, bearing and related components, the larger the pressure ring and pressure screw assemblies. The provided clearance and tension will be determined by the bearing design and size and by the requirements of the bearing manufacturer.

A plurality of annular guide pin or rod retainers 170 are secured to the first side 150 of the pressure ring 72 over each of the adjusting apertures 153. A central opening 172 is aligned with each of the adjusting apertures 153 and is sized to provide a slidable piloting relationship with the stem of the guide pin or rod 84 as shown in FIG. 2. The sliding relationship of the head 158 to the guide portion 156 together with the sliding relationship between the retainer's primary opening 172 and the cylindrical shank of the guide pin or rod 84, maintains the locking pressure ring assembly 14 coaxial with the bearing retainer 32. The guide pin retainers 170 are made of hardened steel to minimize potential wear, providing longer service life without appreciable deterioration of alignment accuracy. Each retainer 170 is located on the side 150 of the pressure ring body 72 by a pair of dowel pins 176. Socket head screws 178 are used to secure each retainer 170 to the first side 150 of the pressure ring 72. The guide pin or rod retainer 170 can be integrated into the main body of the pressure ring 72 by providing a blind bore therein from the second side 152 of pressure ring 72 and providing a hole through the first side 150 equal in diameter to the primary opening 172.

Figure 3:
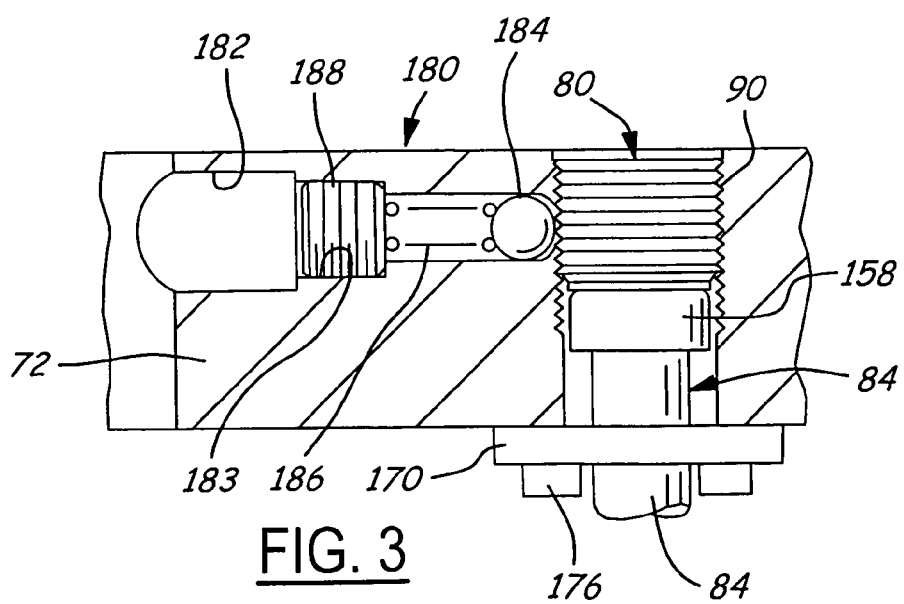
FIG. 3 is a sectional view taken in the direction of arrows 3—3 of FIG. 1 and illustrating a locking mechanism for the pressure screw of the locking or pressure ring assembly.

A plurality of screw lock assemblies 180 are circumferentially spaced and disposed in the body of the pressure ring 72 as shown in FIGS. 1 and 3. Each screw lock assembly 180 has a lock aperture 182 in the pressure ring 72 normal to the corresponding pressure screw assembly 80. A part of the aperture 182 is threaded at 183. The screw lock assembly 180 includes a steel ball 184, a spring 186 and a set screw 188. The ball 184 is disposed in the lock aperture 182 against the externally threaded pressure screw body 90. The spring 186 is located in the lock aperture 182 between the steel ball 184 and the set screw 188 which threadingly engages the threaded portion 183 of the lock aperture 182. Tightening of the set screw 188 increases the force from the spring 186 against the steel ball 184, thereby increasing the torque required to turn the pressure screw body 90. Thus, the screw lock assemblies 180 maintain the position of the pressure screw bodies 90 in the threaded adjusting apertures 153 located in the pressure ring 72.

The pressure ring assembly 72 is installed on the mill roll shaft 12 as follows: a guide pin or rod retainer 170 is slipped over the shank portion of each of the guide pins or rods 84. Assembled guide pins or rods 84 and retainers 170 are aligned with each of the guide portions 156 of the adjusting apertures 153, with the heads of the guide pins 84 disposed in guide portions 156. Dowel pins 176 are installed to position the retainers 170 relative to the adjusting apertures 153. The socket head screws 178 are then installed to fix the guide pin retainers 170 to the first side 150 of the pressure ring 72.

The bearing retainer 32 is then slipped over the mill roll shaft 12 with its loading face 34 disposed toward the chock bearing 16. The seal plate 52 is slipped over the retainer 32 and fixed to the bearing chock housing 50. The labyrinth seal 54 formed between the seal plate 52 and the bearing retainer 32 substantially prevents dirt and contamination from reaching the bearing 16. The pressure ring 72 is next slipped over the mill roll shaft 10 with the extending guide pins 84 directed toward the bearing retainer 32. The pressure ring 72 is pushed towards the bearing retainer 32. The primary apertures 172 are aligned with the cavities 46 and the bearing retainer 32. Each of the axially extending portions of the guide pins 84 are inserted into the cavities 46 of the bearing retainer 32. The end of each rod 84 bottoms out against the bottom of the cavity 46 as best shown in FIG. 2. Thereafter, the set screws 154 are adjusted to retain the rods 84 in cavities 46.

The pressure screw assembly 80 are threaded into the threaded portion of the adjusting apertures 153. The steel balls 184 are deposited one by one in each of the lock apertures 182 and backed up by the springs 186 and set screws 183 which are also installed in the lock apertures 182.

The retaining ring or reaction member 68 is slipped into the groove 70, over the second cylindrical portion 20. The adjusting screws 98 are then turned so as to tension the spring against the thrust bolt 94 and in turn moves the floating pad 92 against the head 158 of the guide pin or rod 84. The adjusting screw 98 is tightened to allow no movement of the thrust pad 82. The tightening of the main pressure screw assembly 80 provides solid locking of the pressure ring 72, retaining lock ring 68 and bearing retainer 32 to the chock bearing 16 thereby locking the chock 50, bearing 16 and roll 10 into one assembly.

It is then necessary to back off the adjusting screws 98 a predetermined number of turns, as an example, two turns. This will relax the tension in the coil springs 96 and will provide for axial movement of the chock bearing 16, while still maintaining some tension that will allow the bearing 16 to float and provide axial clearance for thermal expansion.

Throughout the travel of the adjusting pressure screws 98, the guide pins 84 are maintained in an axial orientation by the cooperation of the guide pin flanges or retainers 170 and the primary apertures or openings 172 with the cylindrical shank portions of the rods 84. The desired level of thrust load against the chock bearing 16 is then developed by the pressure screws 98 acting against the heads 158 of the guide pins or rods 84. When the pressure screws 98 are fully installed, they are nearly flush with the second side of the pressure ring 72. The set screws 188 of the screw lock assemblies 180 are tightened to prevent any loss of thrust load against the bearing 16 during operation of the mill. The pressure screw assemblies 80 are prevented from backing out or loosening by the pressure exerted on them by the screw lock assemblies 180.

The force applied against each pressure screw assembly 80 by the steel ball 184 is variable, depending on the amount of the spring 186 that is compressed by the set screw 188. The set screws 188 can, of course, be partially unthreaded to reduce the force against the pressure screw assemblies 80 to allow their adjustment. After adjusting the pressure screw assemblies 80, the set screws 188 can be retightened against the springs 183 to relock the pressure screw assemblies 80.

With the interface between the multi part pressure screw assembly 80 and the head 158 of the guide pin or rod 84 being effectively sealed off and protected from contaminants within the adjusting aperture 153, a highly reliable and sustainable bearing retaining load is achieved with the present locking ring assembly.

Other aspects, objects, features and advantages of the present invention can be obtained from a study of the patent drawings, the disclosure and the appended claims which follow.

What I claim is:

1. A pressure screw assembly comprising a generally cylindrical body having a pair of end faces and a longitudinally axis extending through said body and said end faces;
    said body having first, second and third concentric interconnected cylindrical bores between said end faces;
    said first bore adjacent one of said end faces being larger in diameter than said other bores;
    said second bore adjacent to the other of said end faces being larger in diameter than said third bore and being internally threaded;
    said third bore connecting said first and second bores;

said cylindrical body having external threads throughout the major portion of its length and including a leading thread and a trailing thread;

the remaining portion of the length of said cylindrical body being provided with an external polygonal shaped head between said other end face and said trailing thread;

a floating annular thrust pad received in said first bore and having a centrally located threaded bore extending part way therethrough;

a bolt having threads on one end and a head on the other end with said threaded end and said head of the bolt being separated by a cylindrical portion;

said bolt located in the bores of said pressure screw body with said head in said second bore, said cylindrical portion in said third bore and said threaded end threaded into the threaded bore of said thrust pad;

a biasing means received in said second bore and abutting the head of said bolt; and an adjustable externally threaded adjusting screw threaded into said second bore and engaging said biasing means.

2. The pressure screw assembly of claim 1, wherein said biasing means is a spring.

3. The pressure screw assembly of claim 2, wherein said spring is a coil spring.

4. The pressure screw assembly of claim 1, wherein said external polygonal shaped head is in the form of a hexagon.

5. The pressure screw assembly of claim 1, wherein said adjusting screw when adjusted varying the tension of said biasing means applied to said bolt and said thrust pad.

6. A pressure screw assembly comprising a generally cylindrical body having a pair of end faces and a longitudinally axis extending through said body and said end faces;

said body having first, second and third concentric interconnected cylindrical bores between said end faces;

said first bore adjacent one of said end faces being larger in diameter than said other bores and having an internal first annular abutment surface parallel to said one end face;

said second bore adjacent to the other of said end faces being larger in diameter than said third bore, being internally threaded and having an internal second annular abutment surface parallel to said other end face surface;

said third bore connecting said first and second bores;

said cylindrical body having external threads throughout the major portion of its length and including a leading thread and a trailing thread;

the remaining portion of the length of said cylindrical body being provided with an external polygonal shaped head between said other end face and said trailing thread;

a floating annular thrust pad received in said first bore and engageable with said first abutment surface, said pad having a centrally located threaded bore extending part way therethrough;

a bolt having threads on one end and a head on the other end with said threaded end and said head of the bolt being separated by a cylindrical portion providing an annular third abutment surface near the threads on said one end of said bolt;

said bolt located in the bores of said pressure screw body with said head in said second bore, said cylindrical portion in said third bore and said threaded end threaded into the threaded bore of said thrust pad;

spring means received in said second bore and abutting the head of said bolt; and an adjustable externally threaded adjusting screw threaded into said second bore and engaging said spring means for varying the tension thereof.

7. The pressure screw assembly of claim 6, wherein said spring means is a coil spring.

8. The pressure screw assembly of claim 6, wherein said external polygonal shaped head is in the form of a hexagon.

9. The pressure screw assembly of claim 6, wherein said adjusting screw when adjusted varying the tension of said spring means, bolt and said thrust pad.

10. The pressure screw assembly of claim 6, wherein said end faces and said abutment surfaces are parallel to one another.

11. A locking ring assembly for retaining a bearing to a shaft rotatably supported on a first axis of rotation comprising:

a bearing retainer of annular shape slideably disposed over the shaft having a loading face on a first side disposed toward the bearing and an oppositely facing second side;

a pressure ring of annular shape slideably disposed over the shaft having a first side disposed toward the bearing retainer and an oppositely facing second side and defining a plurality of adjusting apertures parallel to the axis of rotation, each of said adjusting apertures having a threaded portion between the second face of the pressure ring and a point between the first side and the second side and a substantially smooth guide portion between the threaded portion and the first side of said pressure ring;

said second side of said bearing retainer having a plurality of circumferentially extending cavities therein which are opposite and spaced from said adjusting apertures in said pressure ring;

a plurality of guide pins mounted on one end in said cavities of said bearing retainer and fixedly projecting from said second side of said bearing retainer towards said pressure ring and parallel to the shaft axis;

each guide pin having a head on the other end thereof extending into the opposing smooth guide portion in the first side of said bearing retainer;

a reaction means fixed to the shaft on the second side of the pressure ring thereby limiting axial translation of the pressure ring along the shaft away from the bearing and bearing retainer;

a pressure screw assembly received in each of said adjusting apertures opposite the head provided on the corresponding guide pin, each pressure screw assembly comprising a generally cylindrical body having a pair of end faces and a longitudinally extending axis extending through said body and said end faces and arranged parallel to the first axis of rotation;

each cylindrical body having first, second and third concentric interconnected cylindrical bores between said end faces;

said first bore adjacent one of said end faces being larger in diameter than said other bores;

said second bore adjacent to the other of said end faces being larger in diameter then said third bore and being internally threaded;

said third bore connecting said first and second bores;

each cylindrical body having external threads throughout the major portion of its length and including a leading thread and a trailing thread;

the remaining portion of the length each cylindrical body being provided with an external polygonal shaped head between said other end face and said trailing thread;

a floating annular thrust pad received in said first bore and located opposite the head of the corresponding guide pin and having a centrally located threaded bore extending partway therethrough;

each of said pressure screw assemblies including a bolt having threads on one end and a head on the other end, with said threaded end and said head of the bolt being separated by a cylindrical portion;

each bolt located in the bores of the corresponding pressure screw body, with said bolt head in said second bore, said cylindrical portion in said third bore and said threaded end threaded into the threaded bore of said floating annular thrust pad;

biasing means received in said second bore of each pressure screw assembly and abutting the head of the corresponding bolt; and an adjustable externally threaded adjusting screw threaded into said second bore of each pressure screw assembly and engaging and tensioning said biasing means, effective when the adjusting screw is turned to urge said bolt and said thrust pad against the corresponding head of the guide pin which produces axial displacement of the pressure ring relative to the bearing retainer and a compressive force therebetween when the pressure ring engages said reaction means.

12. The locking ring assembly of claim 11, wherein said reaction means comprises a reaction ring disposed in a circumferential groove in the shaft.

13. The locking ring assembly of claim 11, further comprising a plurality of guide pin retainers, each defining an aperture providing a piloting relationship with a shank of the guide pin between the head and the bearing retainer and fixed to the first side of the pressure ring with the aperture aligned with the pressure ring.

14. The locking ring assembly of claim 11, further comprising a bearing chock fixed to a mill and circumscribing and trapping the bearing wherein both the bearing and the locking ring assembly are retained in position relative to the mill when the shaft is removed from the mill.

15. The locking ring assembly of claim 11, wherein the biasing means of each pressure screw assembly is a spring.

16. The locking ring assembly of claim 15, wherein each spring is a coil spring.

17. The locking ring assembly of claim 11, wherein the external polygonal shaped head of each pressure screw assembly is in the form of a hexagon.

18. The locking ring assembly of claim 11, wherein the adjusting screw of each pressure screw assembly when adjusted varies the tension of said biasing means to urge said bolt and said thrust pad against the corresponding head of the guide pin.

19. The locking ring assembly of claim 11, wherein each adjustable externally threaded adjusting screw when threaded into the adjusting apertures to a depth produces a compressive force between the pressure ring and the reaction means.

* * * * *